United States Patent
Maruyama et al.

(10) Patent No.: US 7,064,925 B2
(45) Date of Patent: Jun. 20, 2006

(54) MAGNETIC HEAD FOR REDUCING PROJECTION OF RETRIEVING AND WRITING UNIT FROM FLOAT SURFACE, AND MAGNETIC RECORDING/RETRIEVING APPARATUS USING THE SAME

(75) Inventors: Yohji Maruyama, Iruma (JP); Tadayuki Iwakura, Odawara (JP); Takashi Kawabe, Hitachi (JP); Makoto Morijiri, Ninomiya (JP); Hiroshi Fukui, Hitachi (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 190 days.

(21) Appl. No.: 10/656,582

(22) Filed: Sep. 5, 2003

(65) Prior Publication Data

US 2004/0109262 A1 Jun. 10, 2004

(30) Foreign Application Priority Data

Dec. 6, 2002 (JP) .............................. 2002-355786

(51) Int. Cl.
  *G11B 5/39* (2006.01)
  *G11B 5/187* (2006.01)
(52) U.S. Cl. ................ 360/126; 360/234.3; 360/235.2; 360/317
(58) Field of Classification Search ................ 360/122, 360/125, 126, 317, 234.3, 235.2
See application file for complete search history.

(56) References Cited

U.S. PATENT DOCUMENTS

| | | | | |
|---|---|---|---|---|
| 5,930,077 A | * | 7/1999 | Obata et al. | 360/235.1 |
| 6,400,531 B1 | * | 6/2002 | Inoue et al. | 360/235.2 |
| 6,477,011 B1 | * | 11/2002 | Hsiao et al. | 360/235.1 |
| 6,524,687 B1 | * | 2/2003 | Horng et al. | 428/216 |
| 6,661,621 B1 | * | 12/2003 | Iitsuka | 360/317 |
| 6,687,089 B1 | * | 2/2004 | Chiba et al. | 360/235.4 |

FOREIGN PATENT DOCUMENTS

| | | | |
|---|---|---|---|
| JP | 2-56712 A | * | 2/1990 |
| JP | 5-182133 A | * | 7/1993 |
| JP | 306215 | | 7/2002 |
| JP | 2003-347157 A | * | 12/2003 |

* cited by examiner

*Primary Examiner*—Jefferson Evans
(74) *Attorney, Agent, or Firm*—Townsend and Townsend and Crew LLP (57) ABSTRACT

A magnetic head comprises a retrieving unit for converting magnetic information output from a recording medium into an electric signal, a writing unit having the function of electromagnetic conversion for writing the magnetic information in the recording medium in response to the electric signal, and a first protective film formed on the retrieving unit. A second protective film is formed on the first protective film. The coefficient of linear expansion of the second protective film is reduced in comparison with that of the first protective film. Furthermore, the first protective film is an alumina film; in contrast, the second protective film is a film made of an alumina film containing silicon oxide therein.

19 Claims, 5 Drawing Sheets

| | THERMAL CONDUCTIVITY ($\mu W/\mu mK$) | YOUNG'S MODULUS (GPa) | POISSON RATIO | COEFFICIENT OF LINEAR EXPANSION (1e-6/K) |
|---|---|---|---|---|
| SUBSTRATE | 20 | 390 | 0.22 | 7.1 |
| FIRST PROTECTIVE FILM: ALUMINA | 1.3 | 410 | 0.25 | 7.1 |
| MAGNETIC POLE IN RETRIEVING FUNCTIONAL UNIT | 35 | 200 | 0.3 | 12.8 |
| MAGNETIC POLE IN WRITING FUNCTIONAL UNIT | 35 | 144 | 0.3 | 8.5 |
| INSULATING LAYER: RESIN | 0.5 | 3.7 | 0.35 | 30 |
| COIL (Cu) | 403 | 110 | 0.3 | 16.2 |
| SECOND PROTECTIVE FILM: $AL_2O_3/SiO_2$ | 1 | 292 | 0.222 | 4.81 |

MAGNETIC HEAD FOR REDUCING PROJECTION OF RETRIEVING AND WRITING UNIT FROM FLOAT SURFACE, AND MAGNETIC RECORDING/RETRIEVING APPARATUS USING THE SAME

BACKGROUND OF THE INVENTION

1. Field of the Invention

The present invention relates to a magnetic head and a magnetic read/write apparatus with the magnetic head mounted thereon and, more particularly, to a technique for reducing projection of a magnetic pole against the magnetic head toward a floating surface.

2. Description of Related Art

A semiconductor memory and a magnetic memory have been principally used as a storage apparatus. From the viewpoint of an access time, the semiconductor memory has been used as an internal storage apparatus; in contrast, from the viewpoint of a large capacity and non-volatility, the magnetic memory has been used as an external storage apparatus. In a recording medium for a magnetic disk drive, a magnetic thin film is formed on a glass or Al substrate. A unit having a function of electromagnetic conversion (i.e., a writing unit) has been used to write magnetic information in the recording medium, and further, another unit (i.e., a retrieving unit) utilizing a magnetoresistive phenomenon, a giant magnetoresistive phenomenon or an inductive phenomenon has been used to retrieve the magnetic information. The above-described writing unit and retrieving unit are essential constituent elements of a magnetic head.

Figure 5:
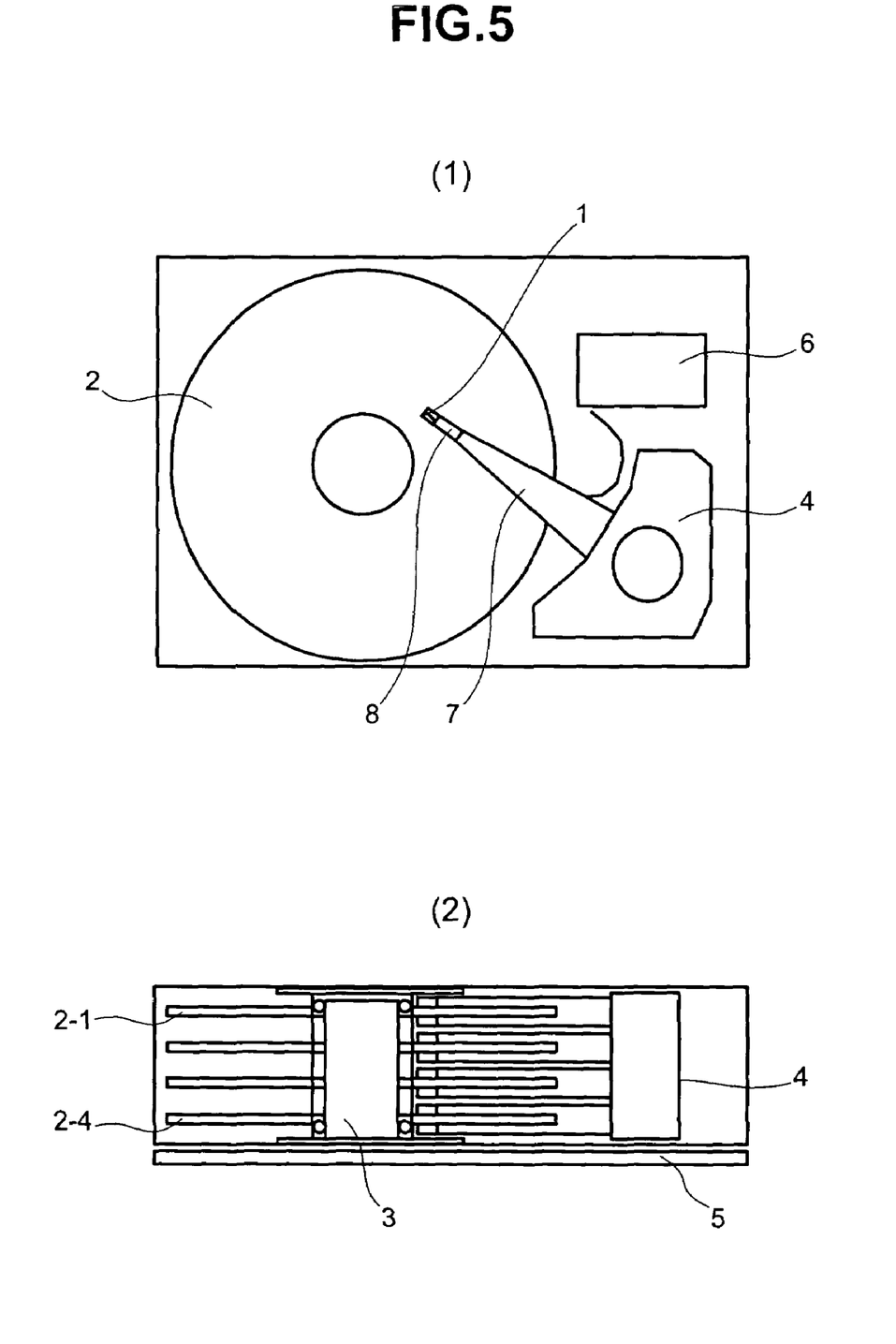

FIG. 5 shows the general configuration of a magnetic disk drive. FIG. 5(1) is a plane view of the magnetic disk drive; and FIG. 5(2) is a cross-sectional view of the magnetic disk drive. A recording medium 2 (actually, a plurality of media 2-1 through 2-4 exist) is connected directly to a motor 3, and it has a function to rotate when information is input or output. A magnetic head 1 is supported by a rotary actuator 4 via an arm 7. A suspension 8 has the function of pressing the magnetic head 1 against the recording medium 2 at a predetermined load. The magnetic head 1 moves on the recording medium 2 according to the rotation of the rotary actuator 4, to be positioned at an arbitrary position, and thereafter, it fulfills each of the functions of writing and retrieving the magnetic information. Moreover, in order to process a signal to a VCM for actuating the rotary actuator or a drive signal to the motor or process a recording or retrieving signal, it is necessary to provide a signal processing circuit 5 and a recording/retrieving circuit 6, which are attached to the main body of the magnetic disk drive.

Figure 6:
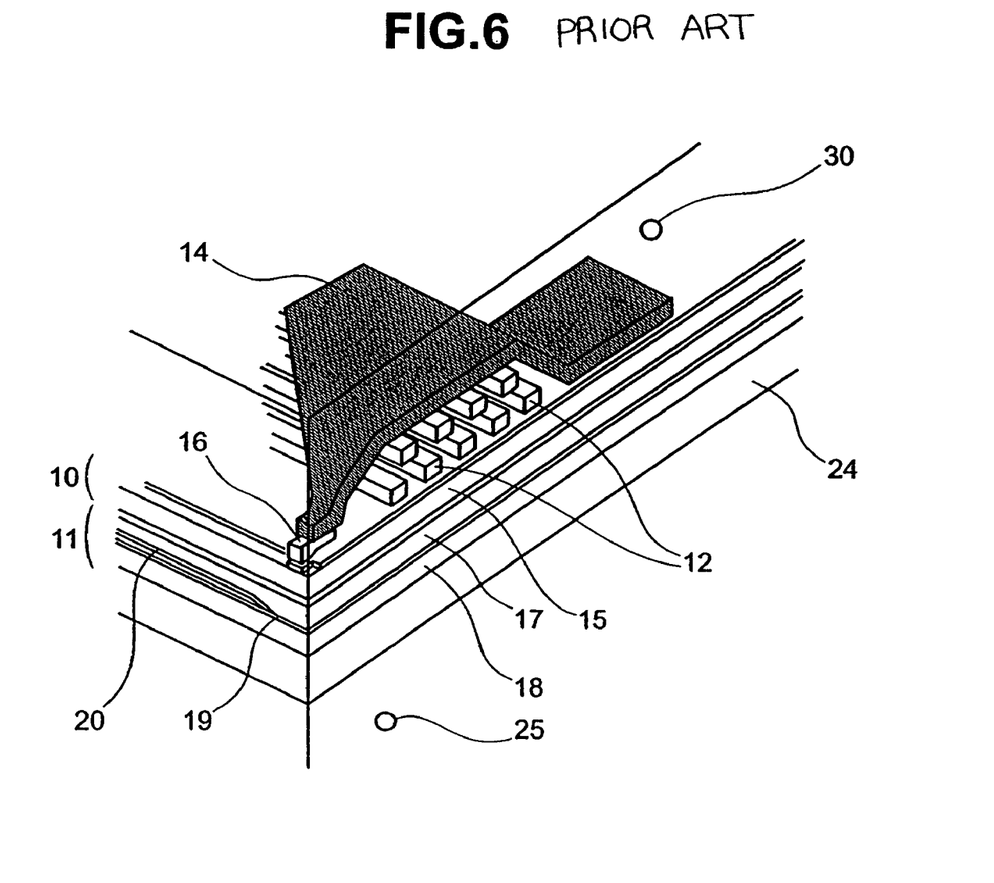
FIG. 6 is a constitutional view showing the specific structure of a magnetic head in the prior art.

FIG. 6 shows the basic structure of the information recording unit and the information retrieving unit, which are mounted on the magnetic head 1. A writing unit 10 comprises a spiral coil 12, a pair of magnetic poles 14 and 15 which hold the spiral coil 12 therebetween and are magnetically coupled to each other, and a further magnetic pole 16 for determining the width of a track.

A retrieving unit 11 comprises a magnetoresistive effect element 19 and an electrode 20 for supplying a constant current to the element and detecting a change in resistance. Another pair of magnetic poles 17 and 18 hold the magnetoresistive effect element 19 and the electrode 20 therebetween, and function as upper and lower shields for shielding an unnecessary magnetic field at the time of a retrieving operation. The above-described writing unit and retrieving unit are formed on a magnetic head body 25 (i.e., a slider) via an underlayer 24.

Furthermore, a protective film 30 is formed on the retrieving unit and the writing unit for the purpose of secureness of the reliability of the above-described constituent elements. The objects of the function of the protective film 30 include maintenance of mechanical strength when the head floats over the medium and prevention of degradation of the constituent elements caused by corrosive atmosphere of outside air. In order to achieve the above-described objects, an alumina film has been generally used as the protective film. A thickness of the film is set to 5 μm or more for the purpose of the maintenance of mechanical strength. A thin metallic film is sometimes formed between the alumina film and the constituent elements in order to improve the adhesiveness of the alumina film. Alternatively, a resin film such as a resist is sometimes be formed, before the alumina film is formed, in order to flatten asperity caused by the structure of the constituent elements. Such a thin metallic film or a resin film has the function as an intermediate layer in forming the protective film.

Since the magnetic disk drive has the features of high reliability and a large capacity, it has been widely adopted in the storage devices that supports a current information technology society. An increase in information quantity in the information society has been astonishing. Naturally, improvement in performance as to speed-up has been required for the magnetic disk drive so as to process a large quantity of information in a short time.

Such speed-up of the magnetic disk drive can be achieved by increasing a recording frequency and the rotation speed of the medium (i.e., a relative speed between the head and the medium). At the present time, an apparatus in which a recording frequency in excess of 400 MHz and the rotation of the medium in excess of 15,000 rpm are achieved has been manufactured among machines called a high-speed magnetic disk drive. Moreover, the technique of high frequency recording has been greatly improved by introducing the techniques of the field of communications. In view of the high-speed rotation of the medium, a heat releasing design has been positively adopted to suppress heat generation caused by friction between air and the surface of the medium which becomes conspicuous at a high-speed rotation in excess of 10,000 rpm.

Under the above-described situation, if the recording frequency is increased up to 500 MHz or higher, the magnetic head and the recording medium come into contact with each other during a recording operation, thereby inducing a trouble of a crash of the magnetic head on the recording medium in an extreme case. The causality of such crash was the deformation of an element, which consists of magnetic poles disposed opposite to the surface of the recording medium (specifically, the magnetic poles 14, 15, 16, 17 and 18 shown in FIG. 6). Such deformation is a result of a thermal expansion by heat generated due to high frequency loss (i.e., the so-called iron loss and the so-called copper loss of the coil). As a result, the element projects from a magnetic head floating surface and the magnetic head comes into contact with the recording medium.

It has been found that such trouble occurs also in a small-sized magnetic disk drive (e.g., 2.5 type or 1.8 type), which does not basically require high-speed performance, in particular. This case is characterized in that the trouble has been caused by not the heat generated during the recording operation since the frequency is low but the temperature of environment in which the magnetic disk drive is used. That is to say, the small-sized magnetic disk drive is excellent in portability, so that it is sometimes used under the environment of high temperature. In this case, there has arisen a problem that a contact or a crash occurs between the magnetic head and the recording medium. This trouble caused by an increase in environmental temperature induces a trouble with the recording medium since the writing unit and the retrieving unit in the magnetic head are thermally expanded by the heat, and therefore, the magnetic poles 15, 16, 17 and 18 shown in FIG. 6 project from the floating surface of the magnetic head. The trouble caused by the environmental temperature in the small-sized magnetic disk drive is attributable also to a shorter distance (i.e., a floating quantity) between the recording medium and the magnetic head than that in a large-sized magnetic disk drive.

As described above, deformation with respect to the floating surface of the magnetic head in the writing unit and the retrieving unit or a phenomenon of the projection from the floating surface of the magnetic head by the heat (that is, the heat generated in the magnetic head per se and the heat of the environmental temperature) has made it difficult to satisfy the demand for a small floating quantity, which is required for achieving, in particular, high density recording. Specifically, it has been difficult to reduce a floating quantity down to so remarkably small a value as about 10 nm or less.

As the prior art capable of solving the above-described problems, Japanese Patent Laid-open No. 306,215/2000 discloses the technique for providing a magnetic head which cannot be deformed by heat, in order to eliminate deformation of a magnetic head on an air bearing surface (ABS) side according to an increase in temperature, reduce a floating quantity in a magnetic disk drive, and prevent any increase in danger of a crash, an increase in TA (i.e., thermal asperity) or the like.

In the technique disclosed in the above-described gazette, an insulating layer covering a coil is made of a resin, a porous member or polyimide having a glass transition point as low as from 70 to 100° C., thereby reducing thermal deformation at high humidity, or the ABS of the head is ground at the same high temperature as that in an operative state, thereby preventing any deformation or projection of the ABS during the operation.

With the above-described prior art, it has been impossible to completely prevent the projection toward the floating surface caused by the thermal deformation of the magnetic poles 15, 16, 17 and 18 made of metal, although a predetermined effect can be produced to some extent. In other words, it has been impossible to stably set the floating quantity of the magnetic head up to a height of about 10 nm, although the effect of suppression of the deformation is found. As a result of study of the cause, it is probable that the writing unit and the retrieving unit are made of different kinds of substances (i.e., metal, an insulator, resin, inorganic substance, and the like when the magnetic pole is taken as an example), and therefore, that a stress occurs between these substances different in coefficient of linear expansion if the environmental temperature is varied, thereby inducing the deformation of the magnetic head.

SUMMARY

The present invention is generally related to provide a magnetic head and a magnetic recording/retrieving apparatus using the same, in which a projecting quantity of the magnetic head from a magnetic head floating surface is reduced and a contact phenomenon generated between the magnetic head and a recording medium caused by an increase in temperature is avoided by providing means for canceling the local deformations of the magnetic head caused by the increase in temperature.

In accordance with one aspect of the present invention, a magnetic head comprises a retrieving unit for converting magnetic information output from a recording medium into an electric signal, a writing unit having the function of electromagnetic conversion for writing the magnetic information in the recording medium in response to the electric signal, and a first protective film formed on the retrieving unit and the writing unit so as to protect the units, is configured such that a second protective film is formed on the first protective film, wherein the coefficient of linear expansion of the second protective film is reduced in comparison with that of the first protective film.

Furthermore, the above-described magnetic head is configured such that the first protective film is an alumina film; in contrast, the second protective film is a film made of an alumina film containing silicon oxide therein.

Moreover, the above-described magnetic head is configured such that the first protective film is an alumina film; in contrast, the second protective film is a film made of mainly carbon or boron.

Additionally, the above-described magnetic head is configured such that the second protective film is a film made of an alumina film containing 5% or more of silicon oxide therein.

With the above-described structures, it is possible to cancel the local deformation of the magnetic head caused by the environmental temperature, and further, to effectively reduce the projecting quantity of the magnetic head from a magnetic head floating surface. In addition, it is possible to avoid a contact phenomenon between the magnetic head and the recording medium caused by variations in temperature, so as to provide a magnetic recording/retrieving apparatus capable of high-density recording within a wide range of operating temperature.

BRIEF DESCRIPTION OF THE DRAWINGS

FIGS. 1(1) and 1(2) are views showing the specific structure of a magnetic head in a preferred embodiment according to the present invention and a view illustrating the function and operation of the magnetic head, respectively.

FIGS. 5(1) and 5(2) are views showing the general configuration of a magnetic disk drive provided with a magnetic head.

[Reference Numerals]
1: magnetic head
2: recording medium
3: motor
4: rotary actuator
5: circuit substrate 6: recording/retrieving circuit
7: arm
8: suspension
10: writing unit
11: retrieving unit
12: coil
14, 15: magnetic pole for writing
16: magnetic pole for defining width of track
17, 18: upper and lower magnetic poles for retrievtion (shield)
19: magnetoresistive film
20: electrode
24: underlayer
25: substrate (slider)
30: protective film (first protective film)
31: second protective film
41: air bearing surface
42: slider

DESCRIPTION OF ILLUSTRATIVE EMBODIMENTS

Figure 1:
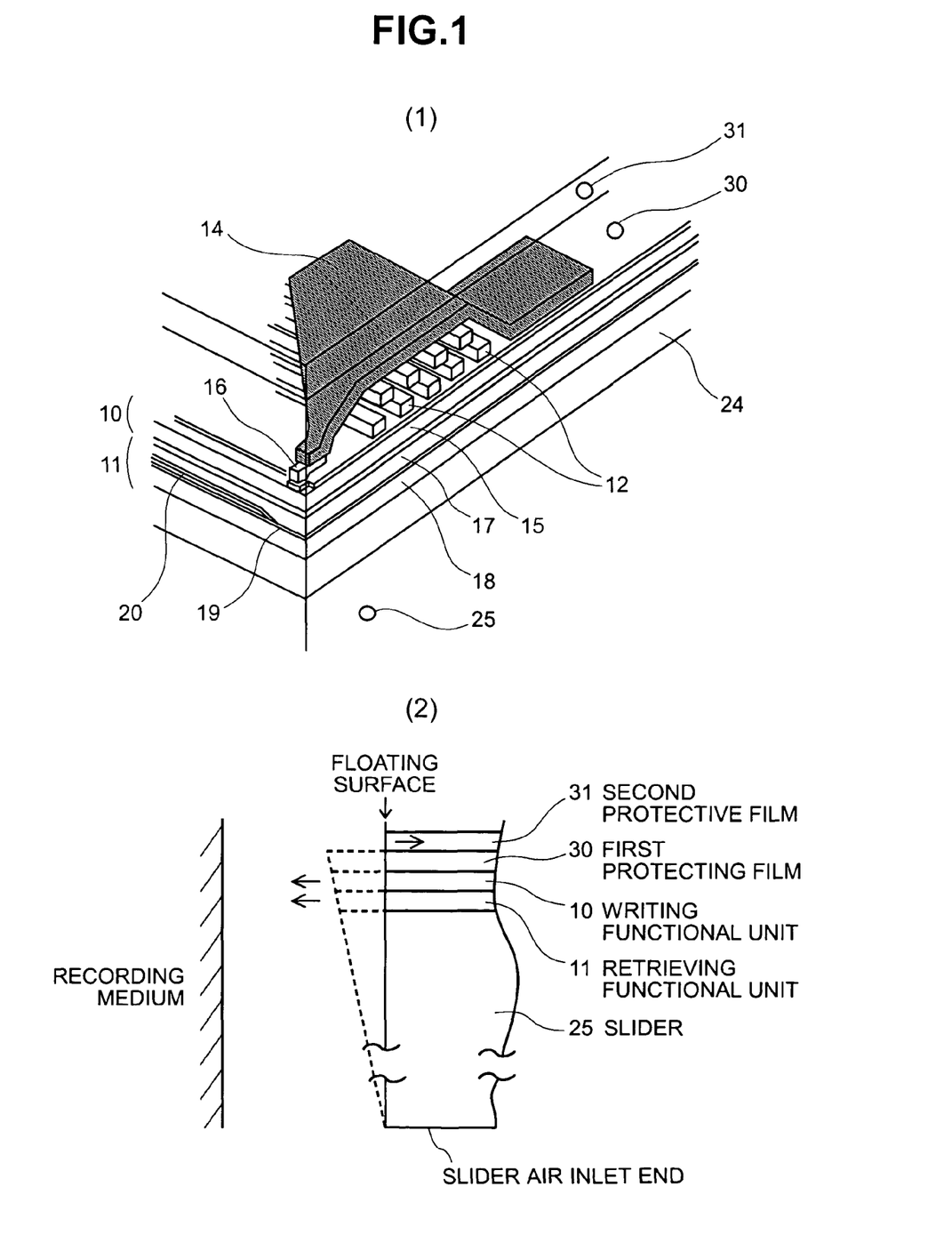
Figure 2:
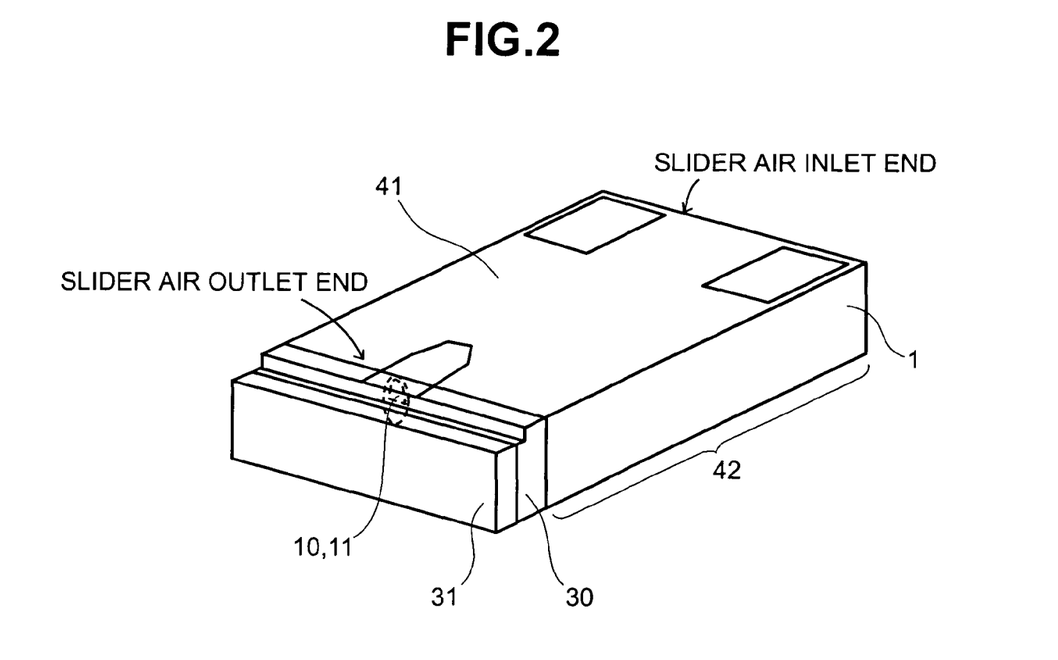
FIG. 2 is a perspective view showing the general configuration of a slider provided with the magnetic head in the present embodiment.
Figure 3:
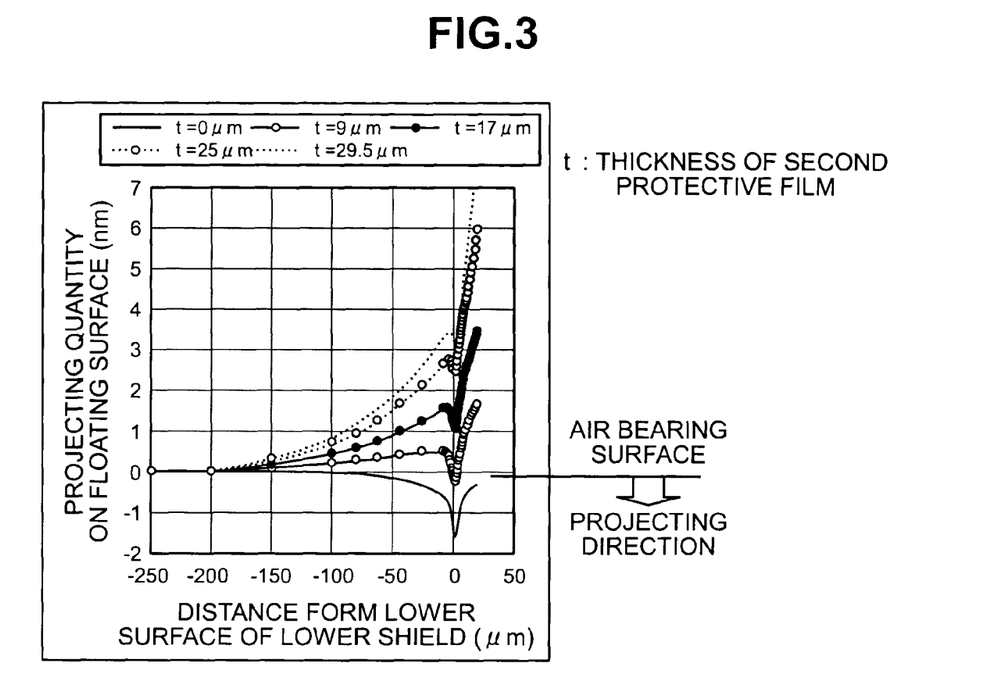
FIG. 3 is a graph illustrating the relationship between the projecting quantity of writing and retrieving units (i.e., magnetic pole portions) and the thickness of a second protective film in the magnetic head in the present embodiment.
Figure 4:
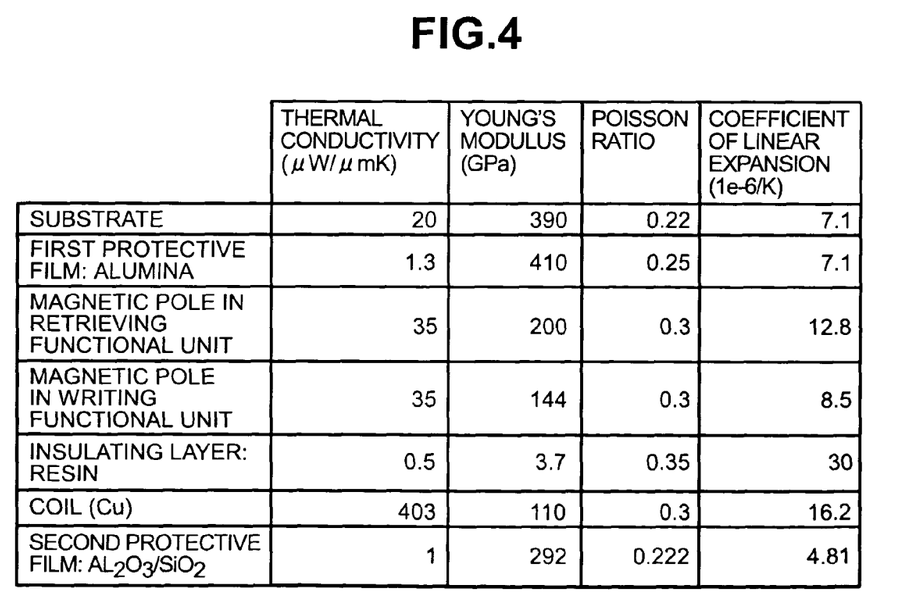
FIG. 4 is a table illustrating the properties including a coefficient of linear expansion of each of constituent elements in the magnetic head in the present embodiment.

A magnetic head in a preferred embodiment according to the present invention will be described in detail below in reference to FIGS. 1 to 4. FIGS. 1(1) and 1(2) are views showing the specific structure of a magnetic head in the embodiment according to the present invention and a view illustrating the function and operation of the magnetic head, respectively. FIG. 2 is a perspective view showing the general configuration of a slider provided with the magnetic head in the present embodiment. FIG. 3 is a graph illustrating the relationship between the projecting quantity of writing and retrieving units (i.e., magnetic pole portions) and the thickness of a second protective film in the magnetic head in the present embodiment. FIG. 4 is a table illustrating the properties including a coefficient of linear expansion of each of constituent elements in the magnetic head in the present embodiment.

In FIG. 1(1), the magnetic head in the present embodiment comprises: a substrate 25 (i.e., a slider) made of, for example, $Al_2O_3$—TiC; an underlayer 24, which is stacked on the substrate 25 and is made of, for example, $Al_2O_3$; a retrieving unit 11, which is further provided on the underlayer 24, for retrieving magnetic information on a recording medium; a writing unit 10, which is further provided on the retrieving unit 11, for performing electromagnetic conversion into the magnetic information to the recording medium; a first protective film 30; and a second protective film 31. Here, the writing unit 10 includes: a spiral coil 12, a pair of magnetic poles 14 and 15, which hold the spiral coil 12 therebetween and are magnetically coupled to each other; and a magnetic pole 16 for determining the width of a track. Furthermore, the retrieving unit 11 includes: a magnetoresistive effect element 19, an electrode 20 for supplying a current to the element and detecting a change in resistance; and another pair of magnetic poles 17 and 18. Here, the magnetic poles 17 and 18 hold the magnetoresistive effect element 19 and the electrode 20 therebetween, and function as upper and lower shields for shielding an unnecessary magnetic field during a retrieving operation. The magnetic head including the writing and retrieving units is formed on the substrate (i.e., the slider) 25 via the underlayer 24.

The embodiment according to the present invention is featured in the structures and properties of the first and second protective films formed over the retrieving unit 11 and the writing unit 10. Therefore, a description will be given in detail of the structures and properties.

From the viewpoint of securing the reliability of the retrieving unit 11 and the writing unit 10, an alumina film serving as the first protective film 30 having a thickness of 25 μm is stacked on the retrieving unit 11 and the writing unit 10 by sputtering. Subsequently, another alumina film 31 containing silicon oxide therein and having a thickness of 9 μm is stacked on the first protective film 30. This film formation is performed by sputtering in the same manner as the formation of the alumina film. Thereafter, the slider provided with the magnetic head is fabricated with the application of slider machining and air bearing surface machining, like in the prior art.

The configuration of the magnetic head in this embodiment is characterized in that the second protective film 31 is provided in addition to the first protective film 30, and further, that the coefficient of linear expansion of the second protective film 31 is smaller than that of the first protective film 30. Furthermore, the configuration of the magnetic head in the present embodiment is featured in that the first protective film 30 may be made of a material which is generally used in the magnetic head (at least the first protective film may be a protective film for general purpose use, although specifying the material of the first protective film is not an essential requirement according to the present invention, as described later). The general structure of the protective film in the present embodiment, in which the second protective film having the smaller coefficient of linear expansion is formed on the first protective film, is apparently similar to the structure including only the first protective film in the prior art. However, it is possible to recognize the use of the two kinds of protective films different in coefficient of linear expansion by analyzing the composition or density of the material, and further, to recognize the relationship of the magnitude of the coefficient of linear expansion between the above-described protective films by measuring the direction of deformation at an end of an air outlet of the slider according to a change in temperature.

Next, a description will be given below of the characteristics in view of the function and operation of the magnetic head in the present embodiment in reference to FIG. 1(2). The retrieving unit and the writing unit made of the magnetic material having the coefficient of linear expansion greater than that of the substrate (i.e., the slider) induce a phenomenon in which they are deformed and project toward a recording medium according to an increase in temperature (caused by heat generated in response to a high-frequency signal in a recording head or high temperature in an operating environment) (as indicated by a dotted line in FIG. 1(2)). In view of the phenomenon in which the retrieving unit and the writing unit are to project, in the present embodiment, the second protective film having the smaller coefficient of linear expansion is formed on the first protective film (refer to FIG. 6, the relationship of the magnitude of the coefficient of linear expansion between the first and second protective films will be describe later). Consequently, having the smaller coefficient of linear expansion, the second protective film provides a force for suppressing the projecting phenomenon, so that the suppressing force suppresses the projecting quantity of the retrieving unit and the writing unit. Thus, the projection can be suppressed as indicated by a solid line in FIG. 1(2).

In other words, the entire magnetic head including the slider is expanded with the increase in temperature. In particular, although the retrieving unit and the writing unit tend to project as indicated by the dotted line according to the magnitude of the coefficient of linear expansion, the projecting quantity of the retrieving unit and the writing unit is eventually reduced by the suppressing force of the second protective film. Since the increased thickness of second protective film increases the suppressing force, the reduction of the above-described projection can be increased accordingly (the tendency is illustrated in FIG. 3, described later).

Incidentally, it is easy to measure the projecting quantity at the end of the air outlet in the slider, and therefore, it is possible to find a condition under which the projecting quantity (i.e., the projecting quantity of the writing and retrieving units) is reduced to the minimum by variously changing the thickness of the second protective film even if a first protective film having an unknown coefficient of linear expansion is used. Also in this case, the coefficient of linear expansion of the second protective film should be naturally smaller than that of the first protective film even if the coefficient of linear expansion of the first protective film is unknown.

FIG. 3 is a graph illustrating the calculation result of the projecting quantity on a floating surface around the writing and retrieving units with variations of the thickness (t) of the alumina film containing silicon oxide therein when the alumina film having a coefficient of linear expansion of 4.81E-6/K and containing silicon oxide therein (i.e., the second protective film) is formed on the alumina film having a coefficient of linear expansion of 7.1E-6/K (i.e., the first protective film). Incidentally, the horizontal axis in FIG. 3 represents a distance from the lower shield (designated by reference numeral 18 in FIG. 1), wherein the leftmost side represents an end at which air flows in most at the slider while the right side represents the side of the protective film.

The vertical axis in FIG. 3 represents the projecting quantity of the writing and retrieving units toward the recording medium. FIG. 3 shows values calculated based on conditions such as the material, dimension, coefficient of linear expansion of each of the constituent elements in the magnetic head and temperature. However, actual measurement has verified that measurement values substantially accord with the data shown in FIG. 3. In this calculation, each of the writing and retrieving units is disposed at the center of the slider air outlet end. The projecting quantity on the vertical axis is plotted in reference to an air bearing surface at the center of the slider at which the projection is largest. For comparison, FIG. 3 also shows the case where no alumina film containing silicon oxide therein is formed in lamination on the protective film (t=0).

Noting the calculation result in the case where no alumina film containing silicon oxide therein is not stacked (t=0), the projection is observed by about 1.6 nm (i.e., the projecting quantity which should be canceled according to the present invention) from the air bearing surface at the positions of the writing and retrieving units. Since the asperity on the recording medium is about 8 nm, and further, a variation in floating quantity when the medium is turned is about 2 nm, the floating quantity, i.e., the distance between the magnetic head and the surface of the recording medium cannot be set to as narrow as 10 nm in consideration of the above-described projecting quantity of about 1.6 nm.

In the meantime, as is seen from FIG. 3, in the case where the alumina film containing silicon oxide therein (i.e., the second protective film) is stacked, the slider air outlet end is largely deformed toward a drawing direction that pulls it as the thickness (t) of the second protective film becomes greater, so that it is found that the second protective film can effectively function in a direction in which the projection (a projecting quantity of 1.6 nm when t=0) in the writing and retrieving units can be canceled.

The present invention is characterized in that the first protective film is thermally deformed in the drawing direction so as to cancel the projection in each of the writing and retrieving units by not reducing the projecting quantity per se in each of the writing and retrieving units, as is found in the calculation result, but further stacking the second protective film having the smaller coefficient of linear expansion on the first protective film, as illustrated in FIG. 1(2).

FIG. 4 is a table showing actually measured values of the coefficient of linear expansion and Young's modulus of the protective film used in the present embodiment. FIG. 4 shows that the coefficient of linear expansion of the alumina film used as the first protective film is greater than that of the alumina film containing silicon oxide therein used as the second protective film. In the case where there is a difference in coefficient of linear expansion between the protective films used in the present embodiment, as illustrated, in order to cancel the projection of about 2 nm (caused by an increase in temperature of about 50° C.) in the writing and retrieving units, it was necessary to form the second protective film in a thickness of about 9 μm (based on the result of an experiment) if the thickness of the first protective film was 25 μm. Here, a more remarkable effect can be produced as the difference in coefficient of linear expansion between the first and second protective films becomes greater, thus reducing the necessary thickness of the second protective film.

The above-described specific experimental example shows that the alumina film contained 15% silicon oxide. It was verified by the experiment that the difference in coefficient of linear expansion between the first and second protective films became prominent when the content of silicon oxide became 5% or more. That is to say, if the content of silicon oxide is less than 5%, there is not much difference in coefficient of linear expansion, and therefore, a remarkable effect cannot be expected to reduce the projecting quantity. In contrast, the large difference in coefficient of linear expansion can be produced as the content of silicon oxide becomes greater. Therefore, in the case where the content of silicon oxide is increased, the thickness of the second protective film for canceling the projecting quantity of the magnetic pole can be set to a small value.

Here, although the second protective film is formed on the first protective film as means for canceling the projection of the magnetic poles in the writing and retrieving units according to the present invention, an alumina film containing silicon oxide therein and having a small coefficient of linear expansion may be used as the protective film per se. However, it has been known that when the magnetic head comes into contact with the recording medium, a reaction product is produced by the reaction between a lubricant applied onto the recording medium and silicon contained in the protective film, and then, the reaction product included between the magnetic head and the medium degrades the floating characteristic of the magnetic head. The reaction product may be possibly produced in the preferred embodiment according to the present invention in which the second protective film is formed. As measures against this, the end of the second protective film on the side of the recording medium is recessed from the slider floating surface according to the present invention, as shown in FIG. 2. With this recessing, the possibility can be reduced that the contact of the second protective film, which most approaches the recording medium, with the recording medium. In the structure shown in FIG. 2, the entire surface of the second protective film is recessed, and further, the first protective film also is partly recessed. In fact, it is important to allow the protective film to be recessed without damaging the writing and retrieving units in the magnetic head during the recessing. The recessing of the protective film also is one of the features of the preferred embodiment according to the present invention.

A protective film mainly containing carbon or boron may be used as the second protective film in place of the alumina film containing silicon oxide therein as the second protective film insofar as the relationship of the magnitude between the coefficient of linear expansion of the first protective film and the coefficient of linear expansion of the second protective film specified in the present embodiment can be maintained. In particular, the use of carbon can produce an effect of an increase in mechanical strength at the rear end of the slider owing to a high hardness, and therefore, it is preferable in achieving a magnetic disk drive which is highly resistant against a shock. In the meantime, in the case where boron is used, a sublimation reaction is generated due to heat generation at the time of the contact if the head should come into contact with the medium, thereby producing an effect that abrasion powder is less liable to remain inside the magnetic disk drive.

As described above, in the preferred embodiment according to the present invention, the projection of the magnetic poles in the writing and retrieving units is suppressed in the direction in which the projection caused by the heat generation or the environmental temperature in the writing and retrieving units can be canceled via the first protective film by satisfying the condition where the coefficient of linear expansion of the second protective film is smaller than that of the first protective film. Consequently, insofar as the above-described condition can be satisfied, the present invention encompasses a magnetic head using, as the first protective film, a protective film that is not an alumina film or a protective film containing another element in the alumina film.

The basic configuration of the magnetic disk drive, to which the magnetic head in the preferred embodiment according to the present invention is applied, is apparently similar to that in the prior art shown in FIG. 5. A recording medium 2 is connected directly to a motor 3, and it has a turning function when information is input or output. A magnetic head 1 is supported by a rotary actuator 4 via an arm 7. A suspension 8 has the function of pressing the magnetic head 1 against the recording medium 2 at a predetermined load. In order to process a retrieving signal or input or output the information, it is necessary to provide a signal processing circuit 5 and a recording/retrieving circuit 6, which are attached to the main body of the magnetic disk drive. The magnetic head 1 moves over the recording medium 2 according to the rotation of the rotary actuator 4, to be positioned at an arbitrary position, and thereafter, it fulfills the function of writing or retrieving magnetic information. In addition, an electric circuit for controlling the magnetic head is provided in the main body of the magnetic disk drive.

According to the present invention, it is possible to prevent any projection of each of the writing and retrieving units from the air bearing surface caused by the increase in temperature by the effect of the deformation of the second protective film in the drawing direction. The shape of the air bearing surface and the rotation speed of the recording medium (i.e., the relative speed with respect to the magnetic head) is set in such a manner that the distance between the magnetic head 1 and the recording medium 2 approaches a distance obtained by adding the asperity on the recording medium (e.g., about 8 nm) to the variation in floating quantity (e.g., about 2 nm) by utilizing the function and operation of the withdrawal of the second protective film.

Furthermore, in the case where the second protective film is made of carbon, since breakage of the magnetic head can be avoided by the mechanical strength of carbon even if a single contact occurs with respect to the recording medium, the magnetic head can be supported by using a suspension having a relatively large mechanical tolerance, and further, the unit cost of the suspension can be reduced. In the meantime, also in the case where the second protective film is made of boron, it is possible to implement the design of the magnetic disk drive in which a suspension having relatively large thermal and mechanical tolerances can be used, thereby reducing developing costs and fabricating costs.

For further understanding, in order to approach the recording medium and the magnetic head each other, an air bearing is formed at the surface 41 of the magnetic head, facing to the surface of the recording medium, as shown in FIG. 2. A portion at which the air bearing surface is defined in the magnetic head is generally referred to as a slider 42. The retrieving unit 11 for converting magnetic information output from the recording medium into an electric signal and the writing unit 10 for writing the magnetic information in the recording medium in response to the electric signal to the coil are provided on the side of the air outlet end of the slider. In the prior art, the protective film 30 consisting of the alumina film is formed on the retrieving unit and the writing unit (on the side of the air outlet end of the slider). In contrast, the second protective film 31 is further formed on the first protective film 30, and further, the coefficient of linear expansion of the second protective film 31 is set to a value smaller (or lower) than that of the first protective film 30 according to the present invention.

Additionally, the first protective film 30 is formed of the alumina film, and further, the second protective film 31 is formed of the protective film mainly containing carbon or boron therein. In the case where the first protective film 30 is formed of the alumina film, the second protective film 31 is formed of the alumina film containing silicon oxide therein. Specifically, the second protective film 31 is formed of the alumina film containing therein 5% or more silicon oxide.

In addition, the magnetic disk drive provided with the magnetic head having the above-described first and second protective films formed thereon also is an example to which the present invention is applied, wherein it is configured such that the distance between the magnetic head and the recording medium becomes about 10 nm.

In other words, the present invention is characterized in that the two kinds of stacks of films different in coefficient of linear expansion are used as the protective films for protecting the writing and retrieving units (naturally, two or more kinds of protective films may be preferred as long as the technical idea according to the present invention can be achieved), and further, that the protective film more apart from the writing and retrieving units has the smaller coefficient of linear expansion.

From the foregoing it will be appreciated that the magnetic head cancels the local deformation of the magnetic head caused by the environmental temperature, and further, to effectively reduce the projecting quantity of the magnetic head from the magnetic head floating surface. Consequently, it is possible to avoid the contact phenomenon between the magnetic head and the recording medium caused by the variations in temperature, thus providing the magnetic recording/retrieving apparatus with high reliability within the wide range of operating temperature.

Moreover, it is possible to allow the recording medium and the magnetic head to approach each other with a clearance of about 10 nm by canceling the local deformation of the magnetic head, thus achieving the magnetic disk drive having a high recording density (that is, at a reduced bit unit cost).

What is claimed is:

1. A magnetic head comprising:
a retrieving unit for converting information output from a recording medium into electric signal;
a writing unit having a function of electromagnetic conversion for writing information in said recording medium in response to said electric signal;
a first protective film formed above an end face of an air outlet of a slider mounting the magnetic head for protecting said retrieving unit and said writing unit; and
a second protective film formed above said first protective film,
wherein said first protective film is formed between said second protective film and said writing unit,
wherein said writing unit is formed between said first protective film and said retrieving unit,
wherein the coefficient of linear expansion of said second protective film is smaller in comparison with that of said first protective film.

2. A magnetic head as claimed in claim 1, wherein said first protective film is an alumina film, and said second protective film is a film made of an alumina film containing silicon oxide therein.

3. A magnetic head as claimed in claim 2, wherein said second protective film is a film made of an alumina film containing 5% or more silicon oxide therein.

4. A magnetic head as claimed in claim 1, wherein said first protective film is an alumina film, and said second protective film is a film made of mainly carbon or boron.

5. The magnetic head according to claim 1, wherein an end of the second protective film on a side near to the recording medium is recessed from a floating surface of the slider.

6. The magnetic head according to claim 1, wherein the end face of the air outlet end of the slider is intersected with a floating surface of the slider facing the recording medium.

7. The magnetic head according to claim 6, wherein the end face of the air outlet end of the slider is perpendicular to the floating surface of the slider.

8. A magnetic recording/reading apparatus comprising:
1) a recording medium, which information is recorded or read out from;
2) rotatable device that rotates the recording medium;
3) supporting/positioning device that supports the magnetic head, and positions said magnetic head at a desired position on the recording medium;
4) a recording/retrieving circuit for processing information signal; and
5) a magnetic head comprising
a) a retrieving unit for converting information output from a recording medium into electric signal;
b) a writing unit having a function of electromagnetic conversion for writing information in said recording medium in response to said electric signal;
c) a first protective film formed above an end face of an air outlet of a slider mounting the magnetic head for protecting said retrieving unit and said writing unit; and
d) a second protective film formed above said first protective film,
wherein the coefficient of linear expansion of said second protective film is smaller in comparison with that of said first protective film,
wherein said first and second protective films are formed in a first direction that intersects with an air bearing surface of the magnetic head.

9. The magnetic recording/reading apparatus according to claim 8, wherein said first protective film is an alumina film, and said second protective film is a film made of an alumina film containing silicon oxide therein.

10. The magnetic recording/reading apparatus according to claim 9, wherein said second protective film is a film made of an alumina film containing 5% or more silicon oxide therein.

11. The magnetic recording/reading apparatus according to claim 8, wherein said first protective film is an alumina film, and said second protective film is a film made of mainly carbon or boron.

12. The magnetic recording/reading apparatus according to claim 8, wherein an end of the second protective film on a side near to the recording medium is recessed from a floating surface of the slider.

13. The magnetic recording/reading apparatus according to claim 8, wherein the end face of the air outlet end of the slider is intersected with a floating surface of the slider facing the recording medium.

14. The magnetic recording/reading apparatus according to claim 13, wherein the end face of the air outlet end of the slider is perpendicular to the floating surface of the slider.

15. A magnetic head comprising:
a retrieving unit for converting information output from a recording medium into electric signal;
a writing unit having a function of electromagnetic conversion for writing information in said recording medium in response to said electric signal; and
a first protective film formed on said retrieving unit and said writing unit so as to protect said units;
wherein a second protective film is formed on said first protective film, and the coefficient of linear expansion of said second protective film is smaller in comparison with that of said first protective film; and
wherein said first protective film is an alumina film, and said second protective film is a film made of an alumina film containing silicon oxide therein.

16. A magnetic head as claimed in claim 15, wherein said second protective film is a film made of an alumina film containing 5% or more silicon oxide therein.

17. A magnetic head comprising:
a retrieving unit for converting information output from a recording medium into electric signal;
a writing unit having a function of electromagnetic conversion for writing information in said recording medium in response to said electric signal; and
a first protective film formed on said retrieving unit and said writing unit so as to protect said units;
wherein a second protective film is formed on said first protective film, and the coefficient of linear expansion of said second protective film is smaller in comparison with that of said first protective film; and
wherein said first protective film is an alumina film, and said second protective film is a film made of mainly carbon or boron.

18. A magnetic head comprising:
a retrieving unit for converting information output from a recording medium into electric signal;

a writing unit having a function of electromagnetic conversion for writing information in said recording medium in response to said electric signal;

a first protective film formed above an end face of an air outlet of a slider mounting the magnetic head for protecting said retrieving unit and said writing unit; and a second protective film formed above said first protective film, wherein the coefficient of linear expansion of said second protective film is smaller in comparison with that of said first protective film, wherein an end of the second protective film on a side near to the recording medium is recessed from a floating surface of the slider.

19. A magnetic recording/reading apparatus comprising:
1) a recording medium, which information is recorded or read out from;
2) rotatable device that rotates the recording medium;
3) supporting/positioning device that supports the magnetic head, and positions said magnetic head at a desired position on the recording medium;
4) a recording/retrieving circuit for processing information signal; and
5) a magnetic head comprising
   a) a retrieving unit for converting information output from a recording medium into electric signal;
   b) a writing unit having a function of electromagnetic conversion for writing information in said recording medium in response to said electric signal;
   c) a first protective film formed above an end face of an air outlet of a slider mounting the magnetic head for protecting said retrieving unit and said writing unit; and
   d) a second protective film formed above said first protective film,
   wherein the coefficient of linear expansion of said second protective film is smaller in comparison with that of said first protective film,
   wherein an end of the second protective film on a side near to the recording medium is recessed from a floating surface of the slider.

* * * * *